Oct. 18, 1955
A. A. L. GIRARD
2,720,944
HYDRAULIC VIBRATION DAMPER
Filed Jan. 4, 1951
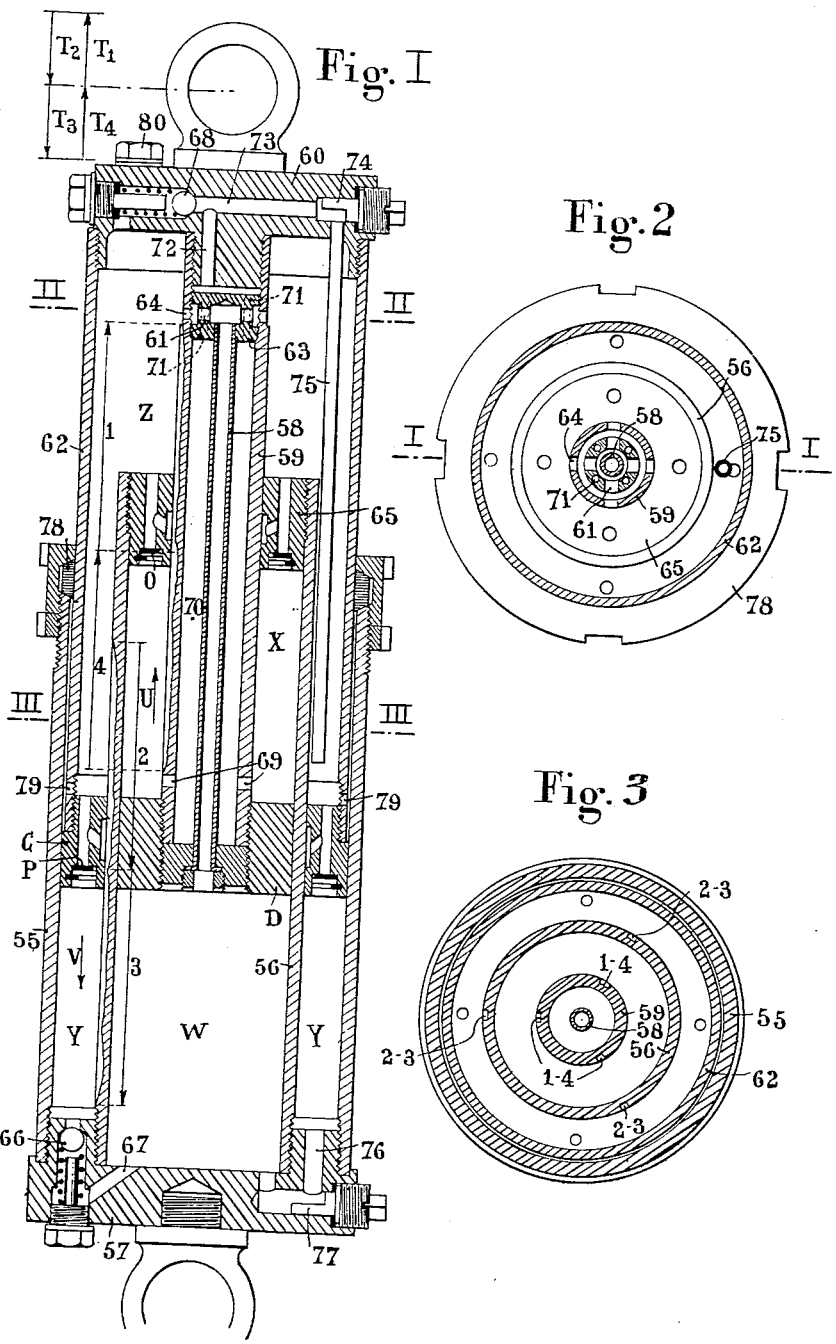
INVENTOR
ALEXANDRE AUGUSTE LEON GIRARD
BY Robert E Burns
ATTORNEY

United States Patent Office 2,720,944
Patented Oct. 18, 1955

2,720,944

HYDRAULIC VIBRATION DAMPER

Alexandre Auguste Léon Girard, Saint-Cloud, France

Application January 4, 1951, Serial No. 204,335

Claims priority, application France January 13, 1950

3 Claims. (Cl. 188—88)

My invention relates to a hydraulic vibration damper for use notably in airplane landing gears. Said damper belongs to the class in which the cushioning resistance is created by the pressure of a liquid which is compelled during the reciprocatory movements to flow through narrow orifices, the pressure within the liquid and, consequently, the cushioning effect being dependent at any given time on the sectional area of said orifices.

A main object of my invention is to provide a hydraulic damper adapted to cushion reciprocatory movements between two assemblies in which the sectional area available to the flow of liquid and governing the cushioning effect is set by design, in every position of the two assemblies relative to each other and in either direction of their relative movement, at any desired value.

A further object of my invention is to give the compressed liquid additional possibilities of escaping through passageways of controllable sectional area.

Yet a further object of my invention is to provide a hydraulic damper in which the pressure on the liquid is automatically prevented from rising dangerously by limiting the same to a predetermined value.

Further features and advantages of my invention will appear from the following specification which is given for the purpose of exemplification and by no ways of limitation, reference being had to the drawing appended hereto, in which:

Figure 1 is an axial sectional view on line 1—1 in Fig. 2.
Figure 2 is a sectional view taken on line 2—2 in Fig. 1.
Figure 3 is a sectional view taken on line 3—3 in Fig. 1.

My damper is composed of two rigid sets slidably received in one another and each of which is rigidly connected with one of the two assemblies the relative movements of which are to be damped.

One of the said rigid sets includes a bottom 57 on which an inner tube 56 and a coaxial outer tube 55 are screwed between which an annular chamber is delimited. Drilled in the bottom 57 is a duct 76 through which the inside of the tube 56 communicates with the annular chamber between the two tubes 56 and 55. A cock 77 which can be set from the outside allows as desired to control the flow through said duct. The inside of tube 56 communicates with the annular chamber through a further duct 67 drilled likewise in the bottom 57. Mounted in said duct 67 is a safety valve 66 which consists of a ball and a calibrated spring and through which the liquid within the tube 56 can escape when the pressure in the annular chamber exceeds a predetermined value. The tube 56 is milled inside with longitudinal grooves 2, 3 having a curvilinear bottom. Screwed in the top end of tube 56 is a ring plug 65 drilled with at least one duct in each of which a non-return valve O is mounted which opens downwards. Said valve consists of a sheet metal disc the one side of which is adapted to close said duct. The displacement of the disc in the opposite direction is limited by a stop, with the result that the liquid is allowed to flow through whenever a downward pressure moves the disc clear of the duct and stopped whenever an upward pressure moves it into engagement with its seat. Screwed on the upper end of tube 55 is a stuffing box 78.

The other rigid set includes a head 60 to the under side of which a tubular rod 59 and an outer tube 62 are screwed coaxially between which an annular chamber is delimited. Tapped vertically through said head 60 is a hole closed by a screw plug 80. Besides, ducts 72 and 73 are drilled through said head 60 through which the inside of the tubular rod 59 communicates with the annular chamber defined between said rod 59 and tube 62. Mounted in the outer end of said duct 73 is a pipe 75 which extends downwards through the annular chamber and a cock 74 housed in the head 60, which cock can be set from the outside to control the flow from duct 73 to pipe 75. The duct 73 providing an extension of duct 72 leads to a further outlet towards the annular chamber; mounted in said duct is a safety valve 68 designed similar to valve 66 of the first rigid set and adapted to let liquid to flow towards the annular chamber upon the pressure within rod 59 reaching a predetermined value. Screwed in rod 59 below head 60 is a ring plug 63 in the bottom side of which an axial hole is drilled which communicates through radial holes 61 with radial holes 64 drilled through the wall of the tubular rod 59. In addition, said ring plug 63 is drilled longitudinally with ducts 71. Secured in the central hole in the bottom of the ring plug 63 is a tube 58, which extends downwards through the tubular rod 59. Milled below the radial holes 64 in the outside of rod 59 are longitudinal grooves 1, 4 with curvilinear bottoms which extend down to a point close to the lower end of said rod 59. Beyond the lower ends of grooves 4 the rod 59 is drilled with radial holes 69 and ends in an externally screw-threaded portion on which an annular piston head D is screwed. Screwed in the lower end of the central hole in said piston head is a ring adapted to lock the bottom end of tube 58 within the same. Screwed in the lower end of the outer tube 62 is an annular piston C drilled with at least one duct in which a non-return valve P is mounted which is effective to prevent the liquid from flowing upwards and which is designed like valve O in the first rigid set.

The two rigid sets are slidably received in one another as shown in Fig. 1, the second set being guided by tube 59, annular piston head D, tube 62 and annular piston C within the ring plug 65, the inner tube 56, the stuffing box 78 and the two tubes 56 and 55 respectively belonging to the first rigid set. The damper thus designed is filled with liquid through the hole closed by the screw plug 80 up to a level higher than that of the radial holes 64 and is thus divided into two pressure chambers X and Y which are completely filled with liquid and two intermediate chambers of which the one W is completely and the other Z partly filled.

In operation, the second set is displaced relative to the first one consequent to the rigid connection between each of the same and one of the two assemblies. In the figure, the sets are represented in their neutral position relative to each other. The second set will be deviated from said neutral position in four successive phases of motion which are represented respectively by the arrows $T_1$, $T_2$, $T_3$ and $T_4$.

During the phase $T_2$, the piston will move in the direction of the arrow V, whereby liquid is forced from chamber Y through the passageways 2 into chamber Z; likewise during the phase $T_3$, the liquid is withdrawn through passageways 3. However, in the course of these movements, liquid is forced out of chamber W through tube 58 and apertures 61, 64 into chamber Z.

Conversely, during the phase $T_1$ the pistons C and D move in the direction shown by the arrow U, valve P is forced open and liquid can flow freely from chamber Z into chamber Y while the non-return valve O is closed and liquid is forced out of chamber X through the passageways 1 into chamber Z; the action is similar during the phase T₄ in which the liquid is wiredrawn through the passageways 4.

It follows that here again the damping action of the device is predetermined in each of the four phases.

Adjustment can be effected separately for phases T₃—T₂ and T₁—T₄ with the aid of cocks 77, 74 respectively. Safety is provided for by means of valves 66, 68 which can be set from the outside. A filling hole is provided which is closed by a screw plug 80. The device is filled with liquid except in the top portion of chamber Z in which an air pocket is left to cancel out variations in the overall capacity of the device due to the displacements of either element with respect to the other.

Chamber X communicates with chamber Z, besides through passageways 1, 4, through aperture 69, annular space 70, apertures 71, 72, 73, adjustable cock 74 and tube 75 the lower end of which is at all times immersed in the liquid, so that no air can flow into chamber X.

In this manner, the cushioning effect throughout the four phases of relative movement T₁, T₂, T₃ and T₄ is obtained by the wiredrawing of the liquid respectively in the several grooves 1, 2, 3 and 4. Consequently, it is possible to design said grooves in such a manner that the sectional area of the same available to the flow and governing the damping effect may have any desired value in either direction and at any point of the travel of the two assemblies interconnected by the damper. Besides, said sectional areas can be increased or decreased by a fixed amount in either direction of the relative movement by suitably adjusting the corresponding cocks 74 and 77.

What I claim is:

1. A hydraulic damper for cushioning the reciprocatory movements of two assemblies relative to each other by wiredrawing a liquid through narrow passageways the sectional areas of which, which govern the damping effect, are fixed at a desired rate in either opposite direction of the relative movement of the assemblies and at every point of the travel, which includes a rigid set fast with one of said assemblies, said rigid set comprising a bottom on which an outer tube and an inner tube are screwed coaxial with each other, which extend upwards and between which an annular space is defined, the inner tube being formed with an outer guide surface milled with grooves with curvilinear bottoms and being provided with a ring plug screwed in its upper end; a further rigid set fast with the other assembly, said rigid set comprising a screw plug on the lower side of which an inner tube and an outer tube are screwed coaxial with each other which extend downwards, the inner tube being formed with an outer guide surface milled with grooves with curvilinear bottoms and adapted to guide said tube in the ring plug screwed in the upper end of the inner tube of the first set, said inner tube of said further rigid set being formed with radial holes located above the guide surface, an annular piston screwed in the lower end of the outer tube of said further set and guided longitudinally in the annular space between the coaxial tubes of the first-mentioned set by the inside of the outer tube and the outside of the inner tube, a piston head with a tapped axial hole screwed on the lower end of the inner tube of said further set and slidably received in the inner tube of the first-mentioned set, a ring plug screwed in said piston engaging the lower end of said inner tube, an axial pipe fitted in the hole in said ring plug extending through the inner tube up to said radial holes, a plug screwed in the inner tube capping the upper end of said axial pipe and adapted through holes formed therein to connect said axial pipe with the radial holes therein, the two aforesaid rigid sets thus defining an annular compression chamber between the inner tube of each set, the ring plug screwed on the upper end of the inner tube of the first-mentioned set and the annular piston head screwed on the lower end of the inner tube of said further set and a further compression chamber between the two tubes of the first-mentioned set, the said bottom and the said annular piston screwed in the lower end of the outer tube of said further set, a first intermediate chamber defined in the inner tube of the first set by the bottom of the same and the piston head screwed on the lower end of the inner tube of said further set, a second intermediate chamber defined between the two tubes of said further set by said screw plug of said further set, the ring plug screwed in the upper end of the inner tube of the first-mentioned set, the inner tube of the same set and the annular piston screwed in the lower end of the outer tube of said further set, the two intermediate chambers communicating with each other through the axial pipe, a liquid completely filling the two compression chambers and the first intermediate chamber and partly filling the second intermediate chamber, a non-return valve in said ring plug to prevent the liquid from flowing out of the first compression chamber and a non-return valve in said annular piston to prevent liquid from flowing out of the second compression chamber.

2. A hydraulic damper for cushioning reciprocatory movements of two assemblies relative to each other by wiredrawing a liquid through narrow passageways the sectional areas of which, which govern the damping effect, are fixed at a desired rate in either opposite direction of the relative movement of the assemblies and at every point of the travel, which includes a rigid set fast with one of said assemblies, said rigid set comprising a bottom on which an outer tube and an inner tube are screwed coaxial with each other, which extend upwards and between which an annular space is defined, said bottom being perforated with a duct leading from the annular space to the inner tube and being provided with a cock to control the flow through said duct, the inner tube being formed with an outer guide surface milled with grooves with curvilinear bottoms and being provided with a ring plug screwed in its upper end; a further rigid set fast with the other assembly, said rigid set comprising a screw plug on the lower side of which an inner tube and an outer tube are screwed coaxial with each other which extend downwards and define an annular space therebetween, the screw plug being perforated with a duct leading from the inner tube, a pipe extending said duct down through said annular space, a cock mounted in the screw plug to control the flow through the duct, the inner tube being formed with an outer guide surface milled with grooves with curvilinear bottoms and adapted to guide said tube in the ring plug screwed in the upper end of the inner tube of the first set, said inner tube of said further rigid set being formed with radial holes located below the guide surface and with radial holes located above the guide surface, an annular piston screwed in the lower end of the outer tube of said further set and guided longitudinally in the annular space between the coaxial tubes of the first-mentioned set by the inside of the outer tube and the outside of the inner tube, a piston head with a tapped axial hole screwed on the lower end of the inner tube of said further set below the radial holes located below the guide surface and slidably received in the inner tube of the first-mentioned set, a ring plug screwed in said piston engaging the lower end of said inner tube, an axial pipe fitted in the hole in said ring plug extending through the inner tube up to the radial holes located above the guide surface, a plug screwed in the inner tube and capping the upper end of said axial tube adapted through radial holes formed therein to connect said axial tube with the radial holes in the inner tube located above the guide surface and with longitudinal ducts through which the inner tube communicates with the duct in the screw plug, the two aforesaid rigid sets thus defining an annular compression chamber between the inner tube of each set, the ring plug screwed on the upper end of the inner tube of the first-mentioned set and the annular piston head screwed on the lower end of the inner tube of said further set and a further compression chamber between the two tubes of the first-mentioned set, the said bottom and the said annular piston screwed in the lower end of the outer tube of said further set, a first intermediate chamber defined in the inner tube of the first set by the bottom of the same and the piston head screwed on the lower end of the inner tube of said further set, a second intermediate chamber defined between the two tubes of said further set by said screw plug of said further set, the ring plug screwed in the upper end of the inner tube of the first-mentioned set, the inner tube of the same set and the annular piston screwed in the lower end of the outer tube of said further set, the two intermediate chambers communicating with each other through the axial pipe a liquid completely filling the two compression chambers and the first intermediate chamber and partly filling the second intermediate chamber, a non-return valve in said ring plug to prevent the liquid from flowing out of the first compression chamber and a non-return valve in said annular piston to prevent liquid from flowing out of the second compression chamber.

3. A hydraulic damper for cushioning reciprocatory movements of two assemblies relative to each other by wiredrawing a liquid through narrow passageways the sectional areas of which, which govern the damping effect, are fixed at a desired rate in either opposite direction of the relative movement of the assemblies and at every point of the travel, which includes a rigid set fast with one of said assemblies, said rigid set comprising a bottom on which an outer tube and an inner tube are screwed coaxial with each other, which extend upwards and between which an annular space is defined, said bottom being perforated with a duct leading from the annular space to the inner tube, the said inner tube being formed with an outer guide surface milled with grooves with curvilinear bottoms and provided with a ring plug screwed in its upper end, a further rigid set fast with the other assembly comprising a screw plug on the lower side of which an inner tube and an outer tube are screwed which extend downwards and delimit an annular space therebetween, the screw plug being perforated with a duct leading from the inner tube to said annular space, the inner tube being formed with an outer guide surface milled with grooves with curvilinear bottoms and being adapted to guide said tube in the ring plug screwed in the upper end of the inner tube of the first set, said inner tube of the said further rigid set being formed with radial holes located below the guide surface and with radial holes located above the guide surface, an annular piston screwed in the lower end of the outer tube of said further set and guided longitudinally in the annular space between the coaxial tubes of the first-mentioned set by the inside of the outer tube and the outside of the inner tube, a piston head with a tapped axial hole screwed on the lower end of the inner tube of said further set below the radial holes located below the guide surface and slidably received in the inner tube of the first-mentioned set, a ring plug screwed in said piston engaging the lower end of said inner tube, an axial pipe fitted in the hole in said ring plug extending through the inner tube up to the radial holes located above the guide surface, a plug screwed in the inner tube and capping the upper end of said axial pipe adapted through radial holes formed therein to connect said axial pipe with the radial holes in the inner tube located above the guide surface and with longitudinal ducts through which the inner tube communicates with the duct in the screw plug, the two aforesaid rigid sets thus delimiting an annular compression chamber between the inner tube of each set, the ring plug screwed on the upper end of the inner tube of the first-mentioned set and the annular piston head screwed on the lower end of the inner tube of said further set and a further compression chamber between the two tubes of the first-mentioned set, said bottom and said annular piston screwed in the lower end of the outer tube of said further set, a first intermediate chamber defined in the inner tube of the first set by the bottom of the same and the piston head screwed on the lower end of the inner tube of said further set, a second intermediate chamber defined between the two tubes of said further set by said screw plug of said further set, the ring plug screwed in the upper end of the inner tube of the first-mentioned set, the inner tube of the same set and the annular piston screwed in the lower end of the outer tube of said further set, the two intermediate chambers communicating with each other through the axial pipe, a liquid completely filling the two compression chambers and the first intermediate chamber and partly filling the second intermediate chamber, a non-return valve in said ring plug to prevent the liquid from flowing out of the first compression chamber and a non-return valve in said annular piston to prevent liquid from flowing out of the second compression chamber, a safety valve in the duct of the first set to allow liquid to flow out of the second compression chamber whenever the pressure therein exceeds a predetermined value and a safety valve in the duct of the second set to allow liquid to flow out of the first compression chamber whenever the pressure therein exceeds a predetermined value.

References Cited in the file of this patent

UNITED STATES PATENTS

| | | |
|---|---|---|
| 913,349 | Batault et al. | Feb. 23, 1909 |
| 1,141,310 | Bradburn | June 1, 1915 |
| 2,029,829 | Messier | Feb. 4, 1936 |
| 2,046,626 | Herrmann | July 7, 1936 |
| 2,064,527 | Ericsson | Dec. 15, 1936 |
| 2,069,791 | Wallace | Feb. 9, 1937 |
| 2,316,924 | Whisler | Apr. 20, 1943 |
| 2,649,938 | Crabtree | Aug. 25, 1953 |

FOREIGN PATENTS

| | | |
|---|---|---|
| 585,681 | Great Britain | Feb. 19, 1947 |
| 683,278 | France | Feb. 25, 1930 |